Patented Feb. 2, 1932

1,843,779

UNITED STATES PATENT OFFICE

PURNAL LYNCH McWHORTER, JR., OF PHILADELPHIA, PENNSYLVANIA, ASSIGNOR TO ELECTRO COMPANY, OF ODESSA, DELAWARE, A CORPORATION OF DELAWARE

PROCESS OF TREATING MINERALS CONTAINING COMPOUNDS OF IRON, POTASSIUM AND ALUMINUM

No Drawing. Application filed November 7, 1927, Serial No. 231,782. Renewed December 5, 1929.

My invention relates to a process for treating a mineral containing compounds of iron, potassium and aluminum to abstract metallic values therefrom. Such a mineral is greensand, and I have thus far practiced my invention in the treatment of that mineral.

Greensand is essentially a mixture of quartz-like sand and glauconite, glauconite being composed mainly of silicates of iron, potassium and aluminum, the major part of the iron being present in ferric form, while some of it is present in the ferrous form.

My invention is an improvement in the process now known which involves the treatment of greensand with sulfuric acid under conditions such as will produce a liquor containing the iron, potassium and aluminum ingredients as mixed sulfates in solution, this solution being separated from the solid siliceous residue.

My invention is directed to the treatment of this clear solution to more effectively separate the iron ingredient of the solution from the aluminum and potassium contents to obtain a substantially iron-free potash alum and to produce an iron salt which can be very easily and economically calcined to produce a ferrous oxide suitable for use, for example, as a paint pigment. I have discovered that a much improved separation of the iron from the potassium and aluminum contents of the solution can be effected by concentrating the solution at a temperature suited to maintain the potassium and aluminum sulfates in solution while precipitating the iron in the form of ferrous sulfate monohydrate, and I have found also that this salt can be calcined more satisfactorily and economically to produce a paint pigment than copperas, which has heretofore crystallized out in this general process, and that the pigment thus produced is a superior product.

I will first describe the production from the greensand of the clear liquor containing the three sulfates in solution, although this part of the process in itself is not novel with me. Greensand is essentially a mixture of glauconite and quartz-like sand, the latter being practically pure silica. While this quartz-like sand may be to a large extent separated before treating the mineral with sulfuric acid, yet it is more completely separable after such treatment, and it is more economical to effect such separation at that time.

The greensand is treated in an open tank with an excess of sulfuric acid which is sufficiently diluted to avoid a solidifying of the mass during reaction, while the extent of the dilution is limited on the other hand to avoid unnecessary slowing up of the reaction. An example of satisfactory proportions is an excess of about 10% of acid and a dilution corresponding to about as much water or perhaps a little less by weight as there is concentrated sulfuric acid. In calculating the water to be added, one should take into account the moisture in the ore itself and the water in the strong sulfuric acid employed. In the tank it is preferable to employ perforated lead pipes through which steam is admitted to cause violent agitation of the liquor as well as to hasten the reaction by the heat thus admitted. After the reaction is complete it is desirable to dilute the solution while still in the tank in which the reaction took place and allow a short settling in the tank in order to allow for a quick settling of the heavier part of the residue. The solution is then decanted to other settling tanks for more complete settling of the residue, and finally a clear solution is decanted into a flat evaporator. The details as to effecting satisfactory separation of the clear solution from the solid matter and as to the washing of the residue to recover the sulfates adhering thereto have nothing to do with my present invention, nor is it necessary to explain them in order that my invention may be practiced.

As the greater part of the iron in greensand is in ferric form, it is necessary in order to practice the process of my present invention that the ferric sulfate in solution should be reduced to ferrous form. This I prefer to accomplish by adding such a reducing agent as metallic iron while maintaining the solution at such temperatures that the rapidity of the reaction is controlled. It has already been pointed out that there was a substantial excess of acid in first treating the mineral, and this excess still remains in the solution. It is necessary to add a weight of iron equivalent to that necessary to convert $Fe_2(SO_4)_3$ into $FeSO_4$, and there must be also an additional amount to take care of losses of hydrogen in the reaction. The reaction when metallic iron is added to a solution of ferric sulfate having an excess of acid is, I believe, that the metallic iron first combines with the free sulfuric acid to form ferrous sulfate and hydrogen, the nascent hydrogen at once reacting with the ferric sulfate to produce ferrous sulfate and sulfuric acid. With this sulfuric acid additional metallic iron will react to evolve further hydrogen. In such reaction, however, some hydrogen will necessarily escape, so that the excess of acid present will be correspondingly reduced. As the ferric sulfate content of the solution begins to be depleted this evolution of hydrogen tends to increase, but this can be kept to a comparatively small loss by gradually reducing the temperature as the reaction proceeds. I have found that very satisfactory results are obtained if the solution is heated to about 80° C. at the beginning of the reaction and gradually reduced to about 60° C. towards the end of the reaction. The reaction is exothermic but not to such an extent as to maintain the temperature to the desired point, and some heat should be continuously added. As this part of the process has been practiced the reduction is substantially complete in about 24 hours, the specific gravity in the meanwhile having increased from 1.275 at 15° C. to 1.375 at 15° C.

The next step is the precipitation in accordance with my present invention of ferrous sulfate monohydrate ($FeSO_4 \cdot H_2O$). The effectiveness of this precipitation is due to the difference in solubility of ferrous sulfate and of potash alum at various temperatures. The latter crystallizes out when the solution is cool. These sulfates have very slight solubility at low temperatures. With increasing temperature their solubility begins to increase, slowly at first, but with an accelerated rate, until, at about 92.5° C., the potash alum will melt and dissolve in its own water of crystallization. On the other hand, the solubility of ferrous sulfate is at a maximum between about the temperatures of 56° C. and 64° C. It increases with increasing temperature up to about 56° C. and decreases with increasing temperature from about 64° C. to about 100° C. Any precipitation of the ferrous sulfate which takes place below about 56° C. will be in the form of copperas, $FeSO_4 \cdot 7H_2O$, and at such low temperature would be admixed with potash alum crystals. Any precipitation of the ferrous sulfate between about 56° C. and 64° C. will be in the form of ferrous sulfate tetrahydrate, or $FeSO_4 \cdot 4H_2O$, and in this temperature range there would be substantial crystallization of potash alum if the solution is a concentrated one. By maintaining the temperature above 64° C. and preferably at about the boiling point of the solution the ferrous sulfate precipitates as ferrous sulfate monohydrate and the potash alum will nearly all remain in solution, even though the concentration be sufficient to precipitate practically all of the ferrous sulfate in this form.

Preferably the concentration to precipitate the white salt is carried on after first transferring the reduced solution from a flat evaporator into a cylindrical tank provided with a cone bottom, with lead heating coils and with a perforated agitator coil. The heating coil being fed by live steam to effect the evaporation. Preheated air under pressure is brought into the solution through the agitator coil, and this assists in keeping the heating coils free of precipitate while also assisting the evaporation.

At this stage of the process there remains a substantial excess of free acid, the reducing step having been, as described, so conducted as to consume as little free acid as possible. This free acid is useful as its presence prevents hydrolysis of the aluminum sulfate in the solution and the consequent formation of the hydroxide of, or the basic sulfate of, aluminum which would contaminate the white salt. Moreover, the free acid in the solution decreases the solubility of the ferrous sulfate in the solution and thereby makes possible a more effective separation of the potash alum and ferrous sulfate.

In carrying out the process to produce the white salt and the potash alum, the details must be determined by taking into consideration factors affecting the economical efficiency of the process and also factors affecting the purity of the potash alum and, to a lesser degree, of the white salt. The preferred manner of carrying out the details of this process is, I believe, as follows: The concentrated and reduced solution of mixed sulfates as it enters the precipitating tank has a specific gravity of about 1.375 at 15° C. This is heated by the live steam coils to the boiling point, above about 100° C., with precipitation of the white salt until the solution has a specific gravity of about 1.525 at 15° C. The solution is then decanted from the white salt into a crystallizing tank and cooled to about 30° C. At this temperature and concentration, the greater part of the potash alum is crystallized out, but the ferrous sulfate being quite soluble at this temperature nearly all remains in solution. After crystallizing out this potash alum, the clear solution is returned to the precipitating tank and reconcentrated and most of the remaining white salt is precipitated while the solution is boiling. The solution is again decanted and again cooled to allow additonal potash alum to crystallize out. The mother liquor remaining is almost free of iron, potassium and aluminum, and is very highly acid. There is some magnesium in greensand, a considerable part of which will be found as sulfate of magnesium in this mother liquor.

By following the method above described difficulties due to undue viscosity, density and boiling point of the solution are avoided. As a result, evaporation is effected more readily, the heating coils do not become clogged with white salt and the heat efficiency is improved. Moreover, when the solution is too concentrated, the white salt tends to become discolored, perhaps because of the presence of magnesium sulfate with which the solution has become somewhat saturated, and there is also a tendency to crystallize out some potash alum.

It is true that when the precipitation of the white salt is made as complete as possible in one step, the first crystallization of potash alum will be somewhat more iron-free than when carrying out the process in the manner above described, yet on the other hand the potash alum crystallized out after a partial precipitation of the white salt is so nearly iron-free that it needs but a single recrystallization, even without the use of iron precipitants, to obtain a product containing only a negligible trace of iron. To effect this recrystallization the relatively crude potash alum is dissolved in sufficient water to give a specific gravity of about 1.25 at 15° C., which solution is heated to about 95° C. This solution is then permitted to settle for about a half-hour when the clear solution is decanted in a crystallizing tank where it is agitated and cooled by compressed air until the crystallization is complete. Ordinarily the iron content of these crystals is about 0.002%.

Further advantage may be taken of the special solubility characteristics of ferrous sulfate monohydrate if the reduced solution be subjected to a partial vacuum while being concentrated whereby the boiling point of the solution is reduced, say, to about 70° C., where the salt has greater solubility than at higher temperatures. After there has been sufficient evaporation the vacuum can be removed or substantially lessened and the temperature raised to produce the precipitation of the white salt. Thereafter the decanted solution may be cooled to crystallize out potash alum, the remaining solution again concentrated under vacuum, etc.

I believe it to be broadly novel to separate iron sulfate from other sulfates in solution by the method herein described. I have not claimed the invention in the present application apart from its employment in the process of treating minerals, as greensand, as I intend to make this the subject matter of another application.

While I have described in considerable detail one specific embodiment of my invention and the best manner of carrying it on now known to me, it is understood that my invention in its broader aspects is not limited to the specific details which I have described.

Having thus described my invention, what I claim and desire to secure by Letters Patent, is:

1. The process of treating a mineral containing compounds of iron, potassium and aluminum which includes treating the mineral to produce a liquor containing ferrous sulfate and sulfates of aluminum and of potassium, concentrating the solution, precipitating ferrous sulfate monohydrate at a temperature between that of the temperature of maximum solubility of the ferrous sulfate and the temperature of the solution when boiling, within which temperature range the other two sulfates remain in solution, and separating the precipitated salt from the solution.

2. The process of treating a mineral containing compounds of iron, potassium and aluminum which includes treating the mineral to produce a liquor containing ferrous sulfate and sulfates of aluminum and of potassium, concentrating the solution, precipitating ferrous sulfate monohydrate while the solution is at about a boiling temperature at which the other two sulfates remain in solution, and separating the precipitated salt from the solution.

3. The process of treating a mineral containing compounds of iron, potassium and aluminum which includes treating the mineral to produce a liquor containing ferrous sulfate and sulfates of aluminum and of potassium, concentrating the solution to about 1.45 specific gravity or more, precipitating ferrous sulfate monohydrate at a temperature between that of the temperature of maximum solubility of the ferrous sulfate and the temperature of the solution when boiling, within which temperature range the other two sulfates remain in solution, and separating the precipitated salt from the solution.

4. The process of treating a mineral containing compounds of iron, potassium and aluminum which includes treating the mineral to produce a liquor containing ferrous sulfate and sulfates of aluminum and of potassium, concentrating the solution to about 1.45 specific gravity or more, precipitating ferrous sulfate monohydrate while the solution is at about a boiling temperature at which the other two sulfates remain in solution, and separating the precipitated salt from the solution.

5. The process of treating greensand which includes treating it with sulfuric acid to produce a liquor containing mixed ferric, ferrous, aluminum and potassium sulfates in solution, treating the liquor to reduce the ferric sulfate to ferrous sulfate, concentrating the solution, precipitating ferrous sulfate monohydrate at a temperature between that of the temperature of maximum solubility of the ferrous sulfate and the temperature of the solution when boiling, within which temperature range the potassium and aluminum sulfates remain in solution, and separating the precipitated salt therefrom.

6. The process of treating greensand which includes treating it with sulfuric acid to produce a liquor containing mixed ferric, ferrous, aluminum and potassium sulfates in solution, treating the liquor to reduce the ferric sulfate to ferrous sulfate, concentrating the solution, precipitating ferrous sulfate monohydrate at about a boiling temperature at which the potassium and aluminum sulfates remain in solution, and separating the precipitated salt therefrom.

7. The process of treating greensand which includes treating it with sulfuric acid to produce a liquor containing mixed ferric, ferrous, aluminum and potassium sulfates in solution, treating the liquor to reduce the ferric sulfate to ferrous sulfate, concentrating the solution to about 1.45 specific gravity or more, precipitating ferrous sulfate monohydrate at a temperature between that of the temperature of maximum solubility of the ferrous sulfate and the temperature of the solution when boiling within which temperature range the potassium and aluminum sulfates remain in solution, and separating the precipitated salt therefrom.

8. The process of treating greensand which includes treating it with sulfuric acid to produce a liquor containing mixed ferric, ferrous, aluminum and potassium sulfates in solution, treating the liquor to reduce the ferric sulfate to ferrous sulfate, concentrating the solution to about 1.45 specific gravity or more, precipitating ferrous sulfate monohydrate at about a boiling temperature at which the potassium and aluminum sulfates remain in solution, and separating the precipitated salt therefrom.

9. The process of treating a mineral containing compounds of iron, potassium and aluminum which includes treating the mineral to produce a liquor containing ferrous sulfate and sulfates of aluminum and of potassium, concentrating the solution, precipitating ferrous sulfate monohydrate at a temperature between that of the temperature of maximum solubility of the ferrous sulfate and the temperature of the solution when boiling, within which temperature range the other two sulfates remain in solution, crystallizing out potash alum from the solution and calcining the ferrous precipitate to produce ferrous oxide.

10. The process as specified in claim 1 when the solution is maintained with a substantial excess of free acid.

11. The process as specified in claim 5 when the solution before the ferric sulfate is reduced has a substantial excess of free acid and is maintained with a substantial excess of free acid during the precipitation stage of the process.

12. The process specified in claim 1 when carried on to first precipitate only a part of the ferrous sulfate, then crystallize out the potash alum from the separated clear solution and thereafter precipitating the balance of the ferrous sulfate from the solution that has been separated from the potash alum crystals.

13. The method of treating greensand which consists in treating it with sulfuric acid to produce a liquor containing mixed sulfates in solution and having a substantial excess of free sulfuric acid, adding to the solution while heated, a reducing agent, such as metallic iron, to reduce the ferric sulfate to ferrous sulfate while maintaining a substantial excess of the acid, concentrating the solution, precipitating part of the iron as ferrous sulfate monohydrate at a temperature between that of the temperature of maximum solubility of the ferrous sulfate and the temperature of the solution when boiling, separating the liquor from the precipitate and cooling the liquor and crystallizing out potash alum, separating the liquor from the crystals and again heating and concentrating it to precipitate further ferrous sulfate monohydrate, redissolving the potash alum and recrystallizing it from the solution to obtain a substantially iron-free product, and calcining the ferrous sulfate to produce ferrous oxide.

In testimony whereof, I have signed my name to this specification.

PURNAL LYNCH McWHORTER, Jr.